United States Patent
Butterworth et al.

(10) Patent No.: US 7,549,153 B2
(45) Date of Patent: Jun. 16, 2009

(54) APPARATUS AND METHOD FOR CONTENT AND CONTEXT PROCESSING OF WEB SERVICE TRAFFIC

(75) Inventors: Paul E. Butterworth, Alamo, CA (US); Frederick H. Carter, Fremont, CA (US); Joseph R. Cortopassi, Pleasanton, CA (US); Michael S. Schilling, San Rafael, CA (US); Charles E. Thurston, Kensington, CA (US); Mark T. Wallace, San Rafael, CA (US)

(73) Assignee: Amberpoint, Inc., Oakland, CA (US)

( * ) Notice: Subject to any disclaimer, the term of this patent is extended or adjusted under 35 U.S.C. 154(b) by 483 days.

(21) Appl. No.: 10/201,617

(22) Filed: Jul. 22, 2002

(65) Prior Publication Data

US 2004/0133656 A1 Jul. 8, 2004

(51) Int. Cl.
*G06F 3/00* (2006.01)
*G06F 17/30* (2006.01)
*G06F 15/16* (2006.01)
*G06Q 40/00* (2006.01)

(52) U.S. Cl. .................. 719/317; 705/37; 707/4; 707/5; 707/10; 709/202

(58) Field of Classification Search .......... 719/317, 719/318, 310, 311, 328; 709/201–207, 223, 709/217–219, 224; 718/108; 707/1–10; 715/513; 705/37
See application file for complete search history.

(56) References Cited

U.S. PATENT DOCUMENTS

| | | | | |
|---|---|---|---|---|
| 5,367,635 A * | 11/1994 | Bauer et al. | ............... | 709/221 |
| 5,404,523 A * | 4/1995 | DellaFera et al. | ........... | 718/101 |
| 5,655,081 A * | 8/1997 | Bonnell et al. | .............. | 709/202 |
| 5,710,918 A * | 1/1998 | Lagarde et al. | ................ | 707/10 |
| 5,724,516 A * | 3/1998 | Temoshenko | ................ | 709/202 |
| 5,761,673 A * | 6/1998 | Bookman et al. | ........... | 719/311 |
| 5,850,517 A | 12/1998 | Verkler et al. | | |
| 6,085,240 A | 7/2000 | Suzuki et al. | | |
| 6,317,786 B1 * | 11/2001 | Yamane et al. | .............. | 709/224 |
| 6,330,586 B1 | 12/2001 | Yates et al. | | |
| 6,549,952 B1 * | 4/2003 | Plassmann et al. | .......... | 719/311 |
| 2002/0087374 A1 * | 7/2002 | Boubez et al. | ................. | 705/7 |
| 2003/0004912 A1 * | 1/2003 | Pant et al. | ..................... | 706/47 |

(Continued)

OTHER PUBLICATIONS

M. Jones, "Interposition Agents: Transparently Interposing User Code at the System Interface", ACM, 1993, pp. 80-93.*

(Continued)

*Primary Examiner*—Meng-Ai An
*Assistant Examiner*—Charles E Anya
(74) *Attorney, Agent, or Firm*—Cooley Godward Kronish LLP

(57) ABSTRACT

A method of supplementing the operations performed by a web service includes operating an autonomous software agent. The autonomous software agent receives a request directed to a web service and identifies a web service input operation associated with the request. The web service input operation is associated with a set of input actions. The input actions are executed prior to directing the request to web service. The autonomous software agent may also receive a response from the web service. A web service output operation associated with the response is identified. The web service output operation is associated with a set of output actions. The output actions are executed prior to directing the response to a client.

11 Claims, 13 Drawing Sheets

U.S. PATENT DOCUMENTS

2003/0061404 A1* 3/2003 Atwal et al. ............... 709/328
2003/0069834 A1* 4/2003 Cutler ......................... 705/37
2003/0188040 A1* 10/2003 Vincent ..................... 709/317
2003/0233477 A1* 12/2003 Ballinger et al. ........... 709/246
2005/0193097 A1* 9/2005 Guthrie et al. ............. 709/219

OTHER PUBLICATIONS

H. Nwana, et al, "ZEUS: A Toolkit and Approach for Building Distributed Multi-Agent Systems", ACM, 1999, pp. 360-361.*

* cited by examiner

APPARATUS AND METHOD FOR CONTENT AND CONTEXT PROCESSING OF WEB SERVICE TRAFFIC

BRIEF DESCRIPTION OF THE INVENTION

This invention relates generally to web services. More particularly, this invention relates to an autonomous agent that interacts with a web service to provide context and context processing of web service traffic.

BACKGROUND OF THE INVENTION

A web service is a software vehicle that accepts requests from a client to perform operations. At this time, these requests are typically in the form of Extensible Markup Language (XML). Although XML is used as an example, other forms of invocation are also possible. In most cases, a web service returns a response after processing the request. This prior art architecture is illustrated in FIG. 1, which shows a web service client 100 submitting an XML request, as shown with arrow 102, to a web service 104. The web service 104 generates an XML response, as shown with 106.

Web services typically operate independently of a specific computer language, platform, or location. Therefore, a client can contact a web service that is written in a different programming language, which is running on a different platform, and is located across a network.

Because web services can contact each other to request the execution of operations, they serve as building blocks for distributed systems. Distributed systems composed of web services may span multiple machines, a corporate intranet, or the Internet. Combining web services from a base environment with web services outside the base environment, such as those operated by partners or suppliers, can create complex applications, such as shown in FIG. 2.

FIG. 2 illustrates a base environment 200 under common control, such as an intranet. The base environment 200 includes an order processing client 202, which accesses an order processing web service 204. In fulfilling an order, the order processing web service 204 accesses an inventory web service 206, which resides in the base environment 200 and a credit check web service 208, which is located in a first partner environment 210. The inventory web service 206 accesses a shipping web service 212 in a second partner environment 214.

FIG. 3 illustrates a prior art networked computer environment 300 that supports a distributed web service. The computer network 300 includes a client computer 302 connected to a communication link 304, which may be any wired or wireless communication link. Also connected to the communication link 304 are a first server 306 and a second server 308.

The client computer 302 includes a central processing unit (CPU) 310 connected to a bus 312. A network interface 314 is also connected to the bus 312. A memory 316 is also connected to the bus 312. The memory 316 stores web client software 312, which may be used to initiate a web service client request using known techniques.

The server 306 includes a network interface 320 connected to a CPU 324 via a bus 322. A memory 326 is also connected to the bus 322. The memory 326 stores individual executable programs in the form of web services 328A-328N. Server 308 also includes a network interface 330 connected to a CPU 334 via a bus 332. A memory 336 stores individual executable programs in the form of web services 338A-338N.

Using web services to integrate both internal and external data gives an organization flexibility. An organization can focus on creating applications for the business problems in a domain of expertise, and make use of the web services provided by other organizations in order to complete a business process. An organization can also offer its web services for use by other organizations.

Typical web service architectures are based on the following elements: a transport protocol, a message format protocol, a service definition language, and a mechanism to locate the web service. The function of each element is described below.

The transport protocol indicates how messages are sent to the web service. HTTP (Hypertext Transport Protocol) is the most popular transport protocol for web services, as it makes possible universal connectivity via the Internet. HTTP supports a request-response message pattern between a client and a web service. Other transport protocols can also be used for web service communication and for one-way communication (i.e., a request that does not require a corresponding response).

Messages between clients and web services may use SOAP (Simple Object Access Protocol). SOAP is a protocol specification that defines a uniform way of passing XML-encoded data. SOAP also defines a way to perform remote procedure calls using HTTP (or another transport protocol) as the underlying communication protocol. A client sends a SOAP request message to the web service, and receives a SOAP response message in return. Using SOAP, the service requestor and the service provider can communicate as long as they agree on a common transport protocol (such as HTTP) and the message's SOAP definition. This increases the opportunities for reuse, as the service places essentially no constraints on the platform, language, or location of its clients.

The web service's interface is defined in a Web Services Description Language (WSDL), which is an interface description language defined in XML. In order to announce its operations to potential clients, a web service provides a WSDL file that describes the service's network address, the list of operations, and the messages that it uses to communicate. If a client has access to the WSDL definition for a service and the proper security credentials, it can access the service with no additional information.

Web service clients typically locate a WSDL file using a published URL address. Currently, clients typically retrieve a WSDL file from a hard-coded URL location. Eventually, vendors will publish the URLs for their web services using UDDI (Universal Description, Discovery, and Integration). UDDI defines the interface to a repository that allows web service providers to advertise their services and allows clients to locate the web services they need.

The construction of distributed enterprise systems from web services raises management challenges. Although the independent language, platform, and location qualities of web services simplify the construction of distributed systems, these characteristics complicate the problems of monitoring, managing, and controlling these systems. The ability to combine these systems magnifies the management challenge.

Web service developers will typically spend their resources to implement business functionality rather than to implement system management facilities, such as security, logging, performance monitoring, and failover. While some implementers may incorporate system management facilities directly into their web services, different organizations may do so with incompatible infrastructures, thereby making it impossible to manage a distributed system in a consistent manner.

Since web service developers are not providing adequate system management tools, individual users must create such tools on an ad hoc basis. An organization utilizing a web service is generally focused on an underlying business that has nothing to do with the web service. Therefore, the web service is outside of the core competency of the business. Accordingly, hiring individuals to run and deploy the web service can be distracting and inefficient. There are various web service application platforms that are commercially available to make this process easier. Nevertheless, these web service application platforms still require recoding of the base web service in order to expand the functionality of the web service. This recoding operation can disrupt the successful operation of the base web service.

In view of the foregoing, it would be desirable to provide a mechanism for enhancing the functionality of existing web services. Ideally, the technique would provide enhanced functionality without disrupting the code associated with the underlying web service.

SUMMARY OF THE INVENTION

The invention includes a method of supplementing the operations performed by a web service. The method utilizes an autonomous software agent. The autonomous software agent receives a request directed to a web service and identifies a web service input operation associated with the request. The web service input operation is associated with a set of input actions. The input actions are executed prior to directing the request to the web service. The autonomous software agent may also receive a response from the web service. A web service output operation associated with the response is identified. The web service output operation is associated with a set of output actions. The output actions are executed prior to directing the response to a client.

The invention also includes a computer readable media to direct a computer to operate in a specified manner. The computer readable media has an autonomous software agent configured to receive a request directed to a web service, identify a web service input operation associated with the request, associate the web service input operation with a set of input actions, and execute the input actions prior to directing the request to the web service. The autonomous software agent if further configured to receive a response from the web service, identifies a web service output operation associated with the response, associates the web service output operation with a set of output actions, and executes the output actions prior to directing the response to a client.

The invention facilitates the conversion of web services into enterprise-class web services that are secure, manageable and dynamically scalable. The invention facilitates the examination of the content of messages, the modification of the content of messages, the rerouting of messages, and the analysis of the context of messages.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 4:
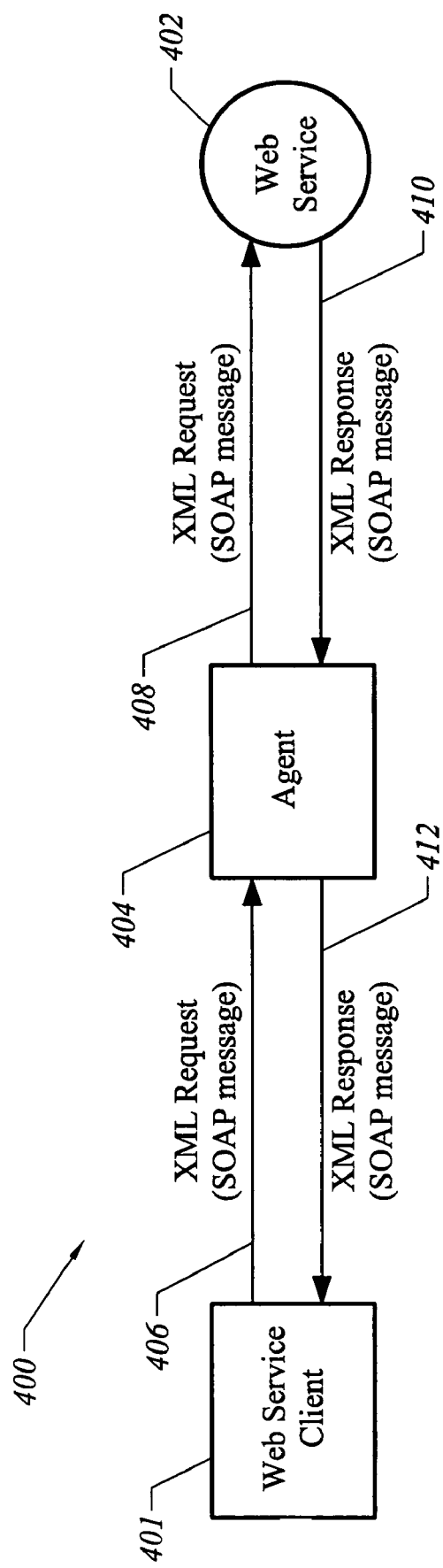
FIG. 4 illustrates a web service architecture configured in accordance with an embodiment of the invention.

FIG. 4 illustrates a web service architecture 400 configured in accordance with an embodiment of the invention. The web service architecture 400 includes a web service client 401, which communicates with a web service 402 through an agent 404. A web service request (e.g., an XML request), as shown with arrow 406, is intercepted by agent 404, which processes the intercepted message in accordance with techniques described below. The message is then routed to the web service 402, as shown with arrow 408. The processing at web service 402 is performed in a standard manner, without alteration by the agent 404. As shown with arrow 410, the output from the web service 402 is applied to the agent 404, which processes the outgoing information in accordance with techniques described below. The output from the agent 404 is applied to the web service client 401, as shown with arrow 412.

Thus, the agent 404 sits between the web service client 401 and the web service 402. In accordance with the invention, the agent 404 is an autonomous entity that interacts with the web service 402, without altering the underlying code associated with the web service 402. The agent 404 provides analyses of the content and context of the messages that are routed to and from the web service 402. The agent responds to different events, such as the receipt of a message, an event occurring, or a variable changing value or state. The agent responds to each event by executing instructions called actions. An action instructs an agent to perform a unit of processing. Typical actions include logging data, sending an email message, sending a request to a web service, and updating variables.

Figure 5:
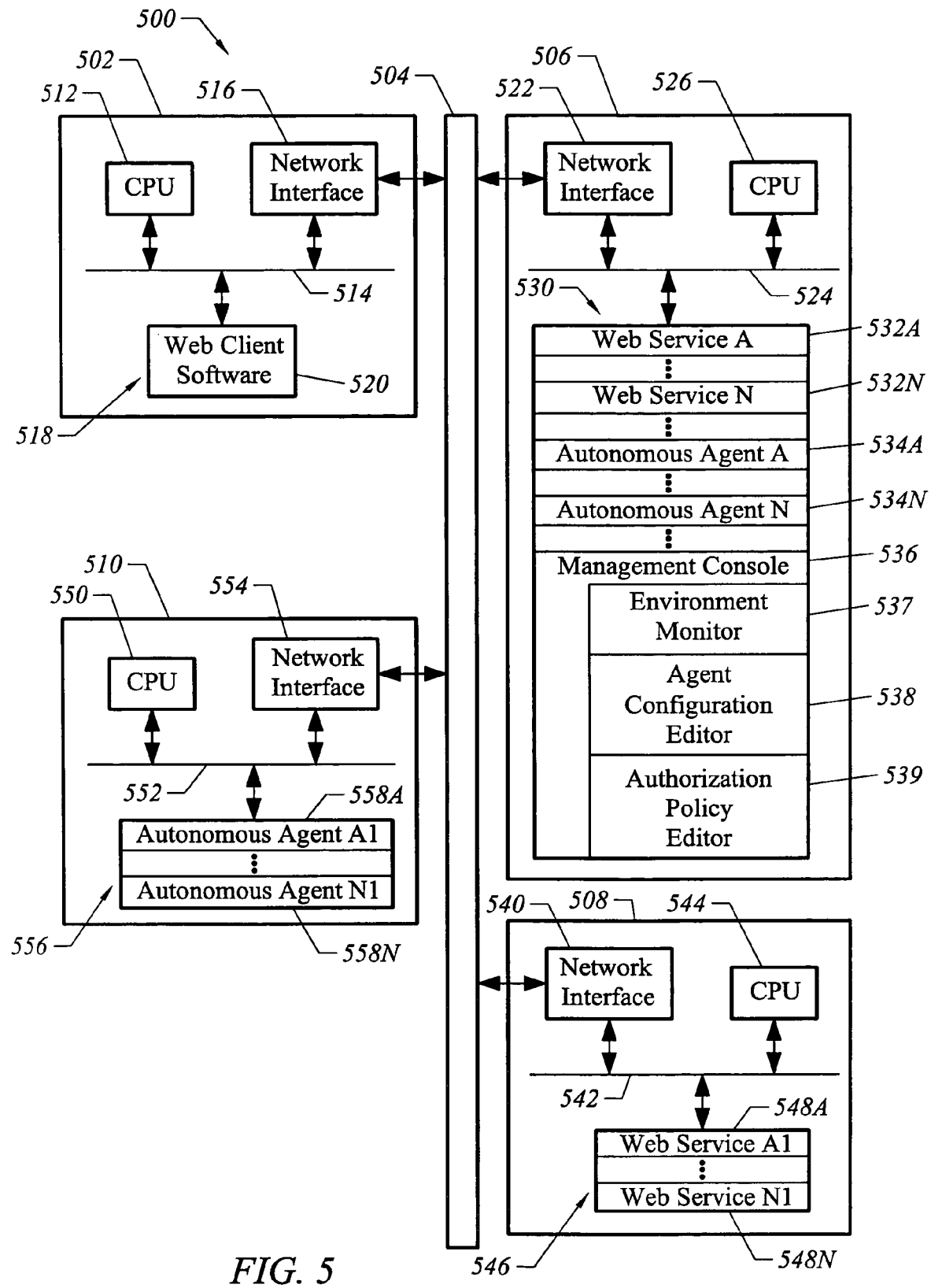
FIG. 5 illustrates a computer network configured to support a web service in accordance with an embodiment of the invention.

FIG. 5 illustrates a computer network 500 configured to support the web service of the invention. The network 500 includes a client computer 502 connected to a communication link 504. Also connected to the communication link 504 are various server computers 506, 508, and 510.

Client computer 502 has a standard configuration, including a CPU 512, a bus 514, and a network interface 516. A memory 518 stores web client software 520, which facilitates the initiation of web service requests in a standard manner.

Server 506 has a network interface 522 connected to a bus 524, which is connected to a CPU 526. A memory 530 is also connected to the bus 524. The memory 530 stores one or more prior art web services 532A-532N. In accordance with the invention, the memory (also referred to as a computer readable media) 530 also stores one or more autonomous agents 534A-534N. In one embodiment of the invention, a separate autonomous agent is provided for each web service. For example, autonomous agent 534A is associated with web service 532A. Memory 530 also stores a management console 536. In one embodiment of the invention, the management console includes an environment monitor 537, an agent configuration editor 538, and an authorization policy editor 539, each of which will be discussed below.

FIG. 5 also illustrates a server 508 with a network interface 540 connected to a bus 542, which is connected to a CPU 544. A memory 546 is also connected to the bus 542. The memory 546 stores a set of web services 548A-548N. The autonomous agents 534A-534N may be associated with the web services 548A-548N. Thus, the autonomous agents 534 of the invention need not be on the same computer as the web service that is being enhanced. This point is further amplified in connection with server 510 of FIG. 5. Server 510 includes a CPU 550 connected to a network interface 554, via a bus 552. A memory 556 is also connected to the bus 552. The memory 556 stores a set of autonomous agents 558A-558N. The autonomous agents may be associated with the web services 532 on server 506 or the web services 548 on server 508.

As can be appreciated from FIG. 5, an agent can operate on the same computer (or container) as the web service it manages, in which case it can be referred to as an in-server agent. Alternately, the agent can operate on a separate computer (or container), in which case it can be referred to as an external agent. An external agent operates as a web service, is addressed as a web service, and functions as an agent for a different web service. Therefore, an external agent can be used to manage the communication with a web service provided by a partner organization. An in-server agent is inserted into the messaging layer of the web service's container. For example, the agent can be installed as a servlet filter in a servlet container. In the case of an in-server agent, existing web service clients can continue to contact the web service at the original address.

Figure 1:
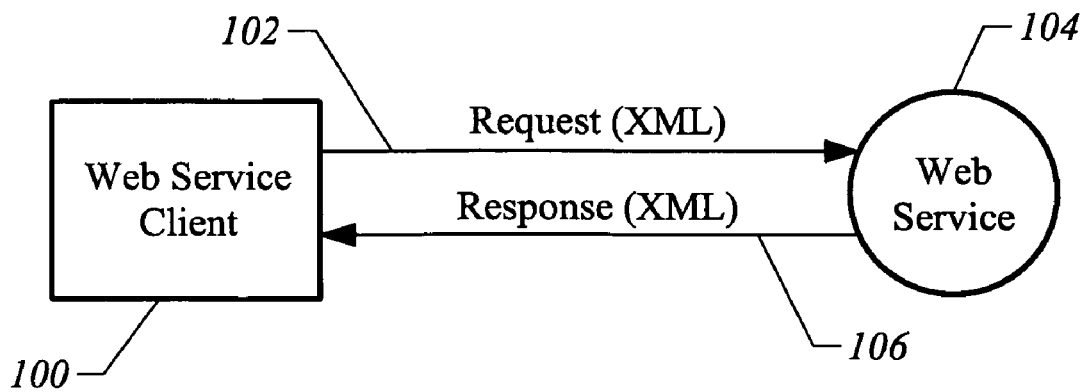
FIG. 1 illustrates a basic prior art web service architecture.
Figure 2:
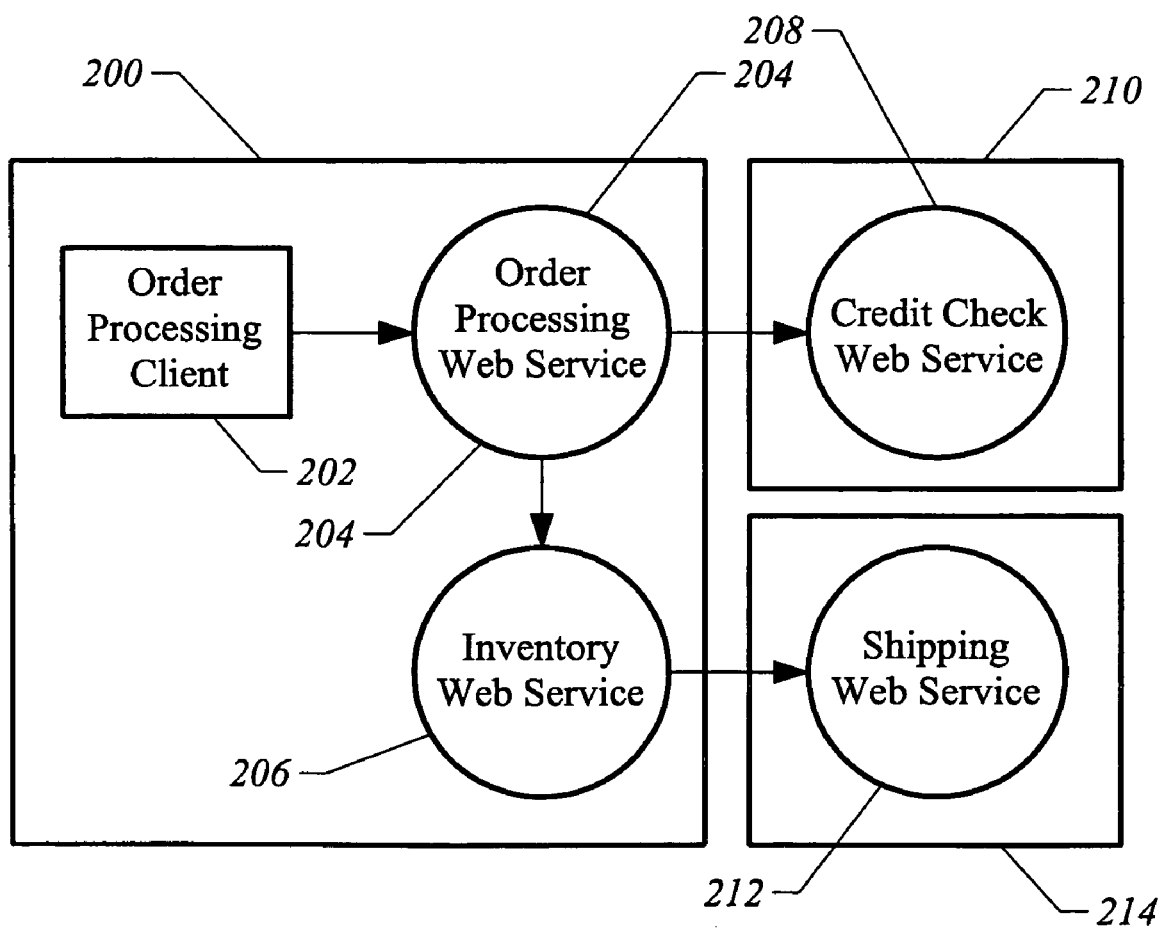
FIG. 2 illustrates a distributed web service architecture utilized in accordance with the prior art.
Figure 3:
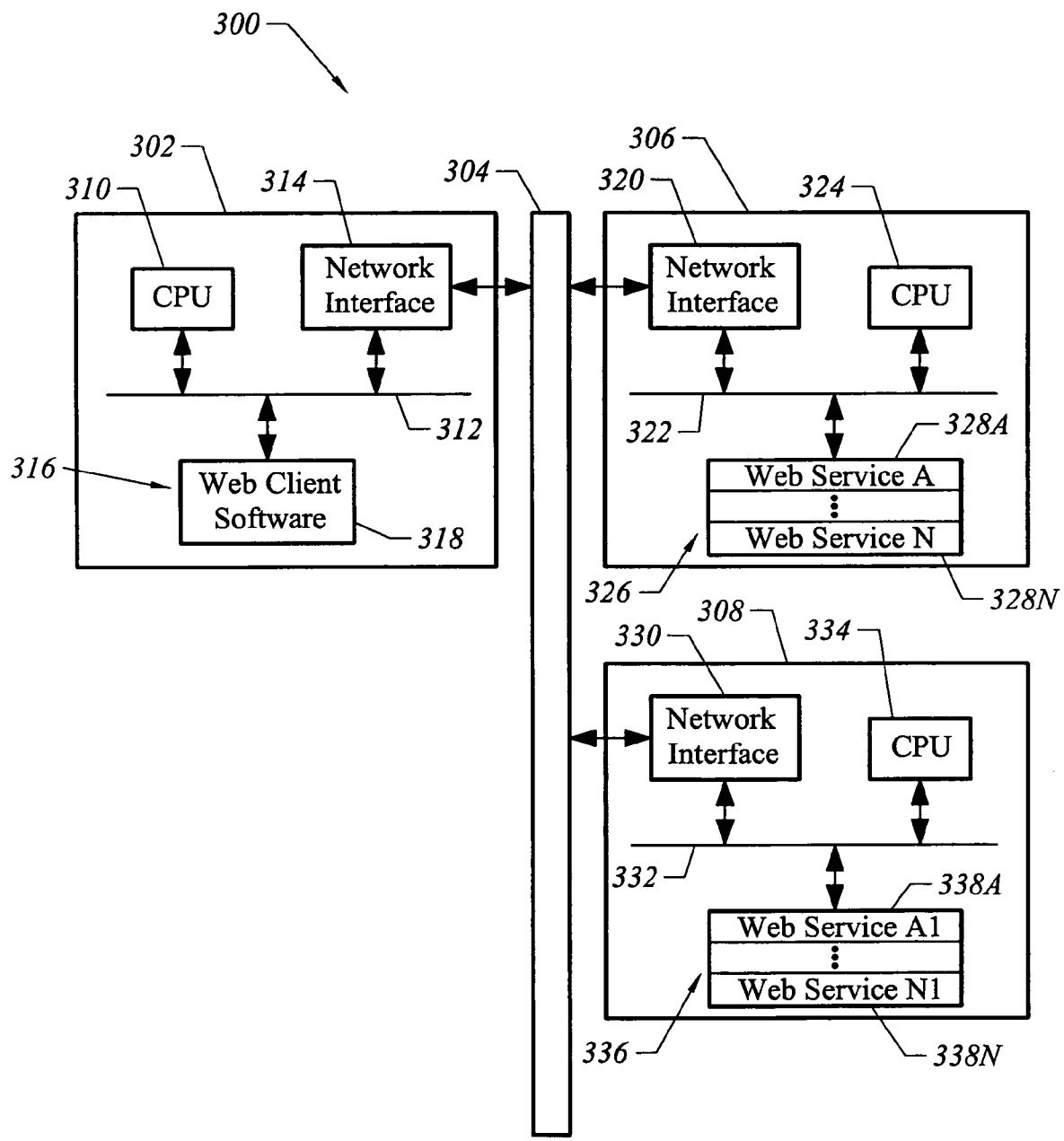
FIG. 3 illustrates a prior art computer network supporting a web service.

In the prior art, such as in the configuration of FIG. 1, a web service client 100 contacts a web service 104 by using the information in the web service's Web Service Description Language (WSDL) file. The WSDL file indicates the URL where the web service is located, lists the operations that are provided by the web service, and defines the structure of the SOAP messages used to request the operations. Thus, WSDL provides a way for service providers to describe the basic format of web service requests over different protocols or encodings. WSDL is used to describe what a web service can do, where it resides, and how to invoke it. Once the client has this WSDL file, it can contact the web service and request its operations.

In the case of the autonomous agents of the invention, a client contacts the agent, and the agent redirects requests to the web service. Because the agent acts as a client to the web service, the agent must know the location of the web service's WSDL file. The clients do not retrieve the WSDL file of the web service, but instead can retrieve the agent's replacement WSDL file. The agent provides this WSDL file that shows the same operations and SOAP message definitions as the original web service's WSDL file, but with the URL changed to point to the agent. When an in-server agent is used, the clients continue to access the web service's WSDL file directly, because the in-server agent is installed in the messaging layer of the web service's container. Therefore, clients do not need to be redirected to the agent's URL.

Figure 6:
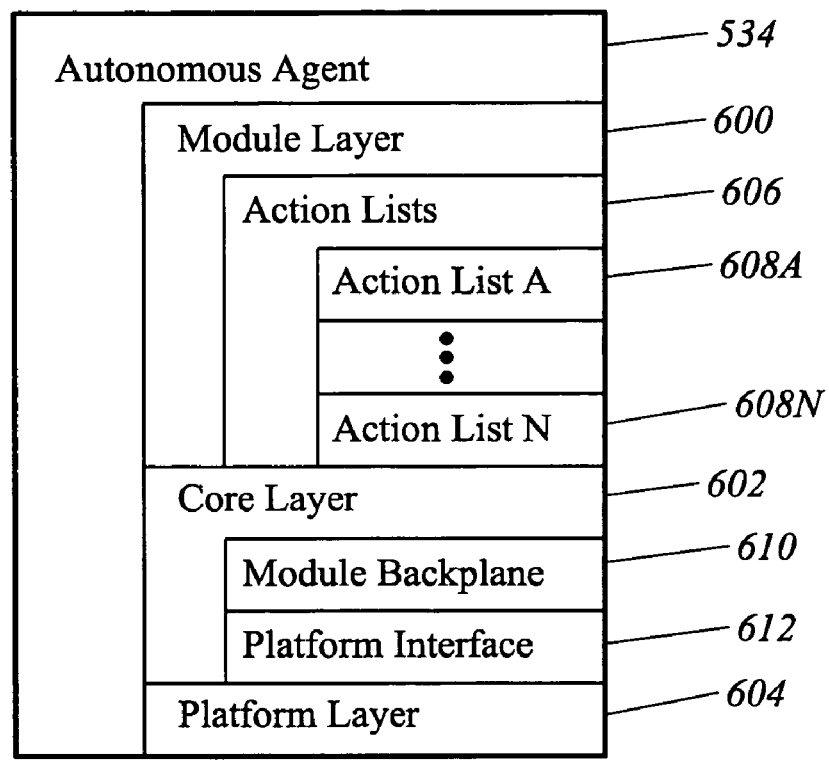
FIG. 6 illustrates a configuration for an autonomous agent that may be utilized in accordance with an embodiment of the invention.

FIG. 6 illustrates an exemplary architecture for an autonomous agent 534 of the invention. In one embodiment, the autonomous agent 534 includes a module layer 600, a core layer 602, and a platform layer 604. The module layer 600 includes one or more action lists 606. FIG. 6 illustrates action lists 608A-608N.

Figure 7:
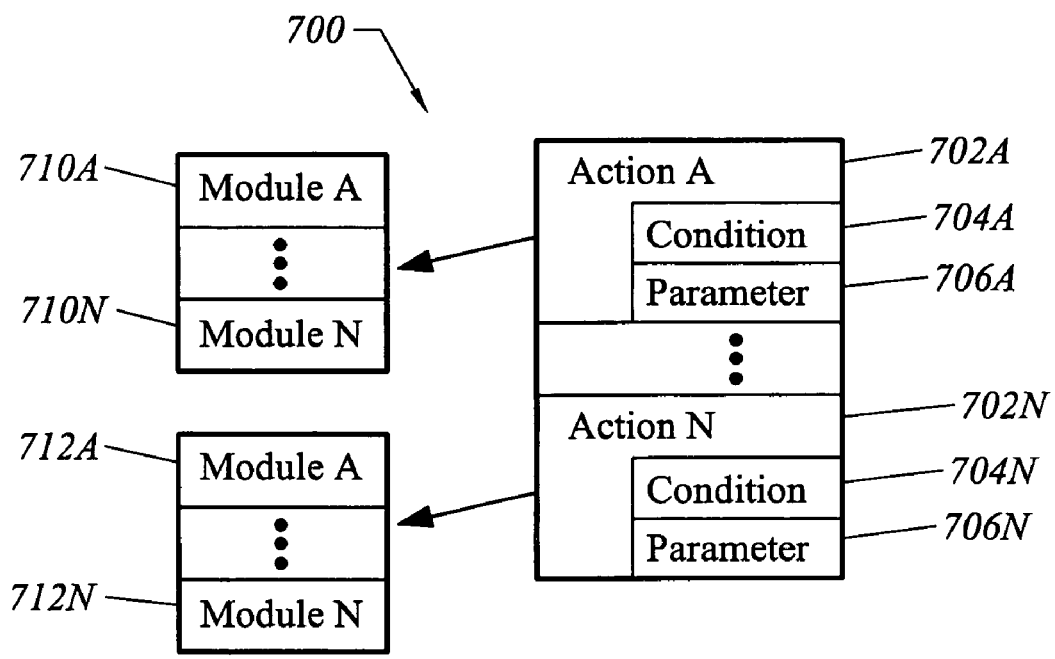
FIG. 7 illustrates an action list that may be used to implement embodiments of the invention.

FIG. 7 illustrates an exemplary action list 700. The action list 700 includes actions 702A-702N. Each action 702 has an associated condition 704 and parameter 706. Each action represents an operation that can be performed in connection with a message. An individual action is implemented using one or more modules. Thus, FIG. 7 illustrates that Action A 702A is implemented using modules 710A-710N, while Action N 702N is implemented using modules 712A-712N. Each module has a different functional attribute, such as a security function, a monitoring function, a logging function, and the like. Unless the actions are linked, they are not aware of one another. Therefore, a failure of one action does not impact other actions.

Returning to FIG. 6, the core layer 602 operates as an interface between the module layer 600 and the platform layer 604. The core layer 602 may be configured to include a module backplane 610 to interface with the module layer 600 and a platform interface layer 612 to interact with the platform layer 604. The platform layer is implemented as a user-selected platform (e.g., JAVA®).

Figure 8:
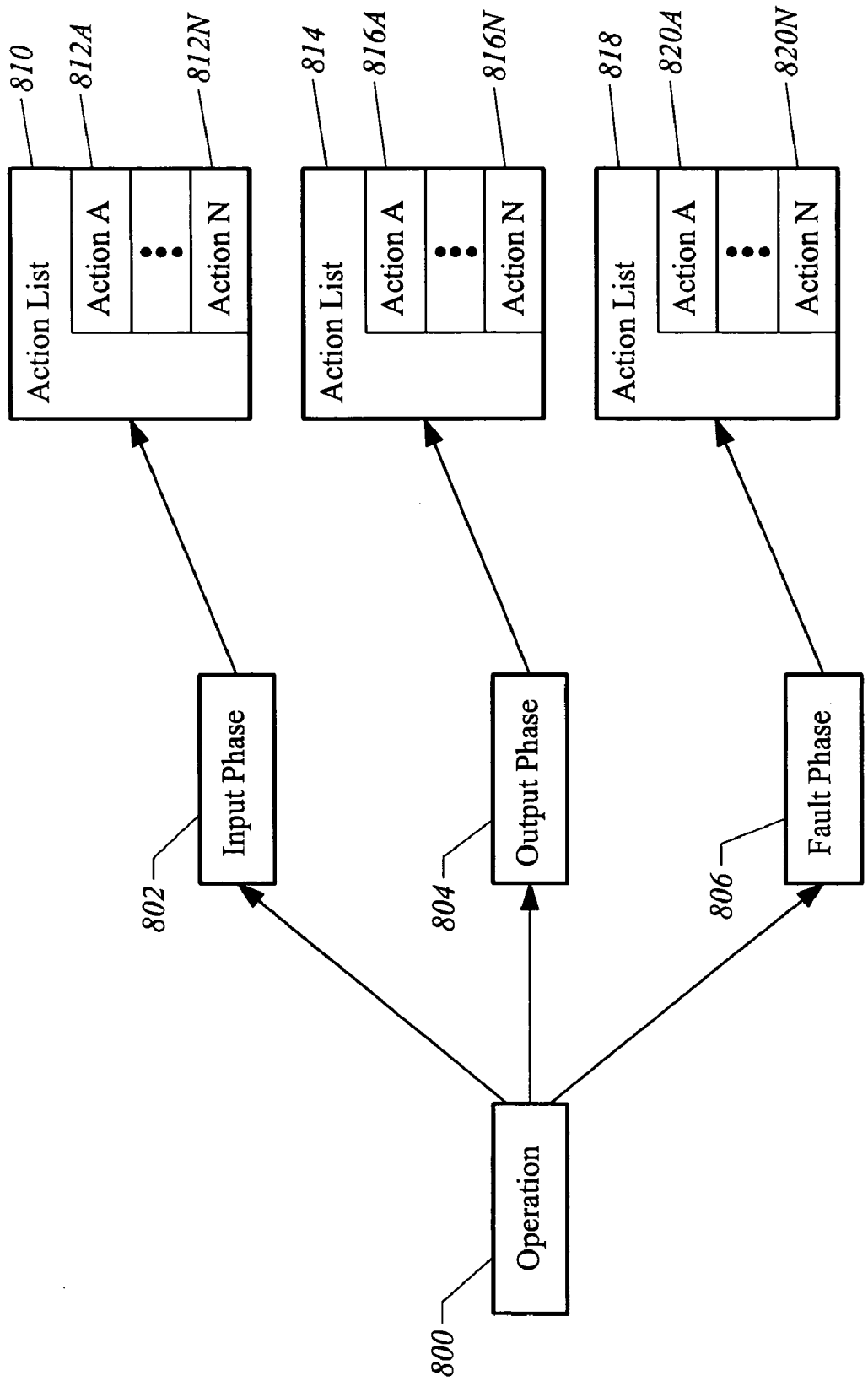
FIG. 8 illustrates a mapping between a web service operation, processing phases associated with the operation, and action lists used to implement the processing phases.

FIG. 8 illustrates the mapping from a message operation to processing phases utilized in accordance with the invention, which are in turn associated with actions lists. Thus, the operation 800 specified within a message is decomposed into an input phase 802, an output phase 804, and a fault phase 806, if necessary. Individual phases or all of the phases may be invoked in response to an operation. For each phase, there is an associated action list. Thus, FIG. 8 illustrates that the input phase 802 has an associated action list 810 with actions 812A-812N. The output phase 804 has an associated action list 814 with actions 816A-816N, while the fault phase 806 has an associated action list 818 with actions 820A-820N.

The actions associated with the invention are more fully appreciated in connection with a more specific example. Consider a stock quote web service that supports different operations, such as getting a quote, selling stock, and buying stock. The syntax associated with this web service may be as follows:

```
stock_quote_web_service
    operation_1 /e.g., get a quote/
    operation_2 /e.g., sell stock/
    operation_3 /e.g., buy stock/
```

The basic operations (e.g., operation_1, operation_2, and operation_3) associated with the stock_quote_web_service are supplemented with the actions of the invention. The actions of the invention do not impact the underlying operations of the web service. Instead, they supplement the underlying operations of the web service without modifying the web service. Thus, the invention provides extended functionality for a web service, without changing the code of the underlying web service. The extended functionality can be in the form of processing based on message content and context processing. The conditions 802 and parameters 804 of the actions facilitate content and context awareness. An example of content awareness would be the analysis of incoming messages to identify all orders over 500 shares. Based upon this content awareness, another action could be invoked, such as advising a sales person of a relatively large order. An example of context awareness would be the tracking of cumulative stock trades in a given time period to determine whether they exceed a threshold. As will be discussed below, an "instrument" can be used as a variable to track the cumulative stock trades. If the threshold is exceeded, then another action can be invoked, such as advising a trading manager.

The invention's use of actions has now been described. The combination of actions into action lists to perform functions executed by an autonomous agent has also been described. Attention now turns to examples of different actions that may be specified in accordance with the invention. The following discussion will also address how actions and action lists are used for processing messages and events in accordance with the invention.

As previously indicated, when a specified message event occurs, an agent executes individual processing instructions called actions. By way of example, the following actions may be utilized in accordance with an embodiment of the invention.

Check Access: apply authorization checks to verify that the requestor is authorized to make a specific request of the web service operation.

Email: send an email message to someone, such as a system administrator.

Log: write a message to a log file or a monitor.

Pivot: move from the input processing phase directly into the output processing phase (without executing the remaining actions in the sequence, and without sending the request to the target web service).

Redirect: redirect the request to an alternate web service instead of contacting the target web service (for example, if the target web service has gone down, redirect the request to a backup web service that provides the same operations).

Send: send a message to another web service before, after, or instead of contacting the target web service (for example, before contacting the target web service, send a message to another web service to locate additional information needed by the target web service to process the request).

Transform: change the format or content of a message using the message itself and its context information.

Update Instrument: update the value of an instrument.

Simple tasks can be accomplished by using single actions. For example, one can use a log action to write an incoming request message to a log file.

One can accomplish a complex task by constructing a sequence of actions. For example, one might create a heartbeat function that periodically contacts a web service. If the web service does not respond after a series of attempts, one can set an instrument value to indicate that the web service is down, so that the agent can redirect subsequent requests to a back-up version of the web service. The heartbeat function might also send an email message to the system administrator to indicate that the agent has lost contact with the web service.

An action list is a reusable sequence of actions. The autonomous agent executes the sequence of actions in response to a single trigger event or multiple events.

Figure 9:
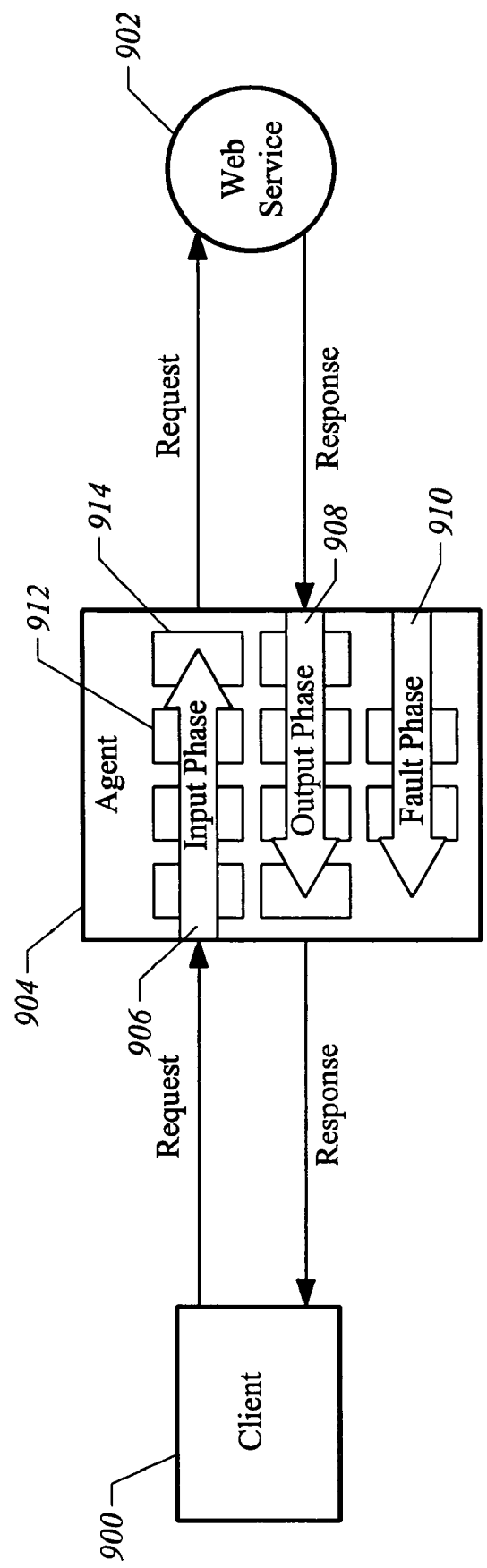
FIG. 9 illustrates web service processing paths utilized in accordance with an embodiment of the invention.

The autonomous agent typically executes actions in response to the receipt of a message. The autonomous agent can be viewed as having distinct message processing phases. FIG. 9 illustrates a standard client 900 and a standard web service 902 with the autonomous agent 904 of the invention positioned in between the two. The autonomous agent 904 includes an input phase 906, an output phase 908, and a fault phase 910. Each phase may invoke one or more action lists. For example, FIG. 9 illustrates the input phase 906 with action lists 912 and 914.

Since the agent 904 resides between the client and the web service, it can interject processing operations before sending the request message to the web service 902 and before returning the web service's response to the client 900. The autonomous agent of the invention can be configured to examine or change the content of messages, to reroute messages, and/or control the processing of messages. Actions can be configured (via their conditions) to register their interest in certain messages and are invoked only on messages in which they are interested. Action lists can also be configured to correlate an incoming message at the input phase 906 with an outgoing message in the output phase 908.

Web services sometimes encounter errors during message processing. These errors can occur when the client formats the message incorrectly, when the web service does not understand the message, or when the web service produces an exception. The fault phase 910 handles such errors. For example, the fault phase defines a special sequence of actions to be performed when the agent receives a SOAP fault from the web service. For example, request and fault messages may be written to a fault log that can be examined by the system administrator.

In an embodiment of the invention, the autonomous agent also supports timed events, instruments, and authorization policies. Instruments and authorization policies support actions, while timed events represent an event class.

A timed event is a form of a module in which actions are executed at a regularly scheduled time interval. Thus, a timed event employs actions, but the actions are not invoked in response to a message, as was the case with the previously discussed action lists. Thus, a timed event includes an instruction to execute an action sequence at a specific time or at a regular time interval. For example, one might define a timed event to write out the values of all instruments on an hourly basis. Alternately, one might schedule a timed event to verify every minute that the web service is up and running. When the timed event is triggered, the agent is notified and executes the scheduled action sequence.

An instrument is a variable defined on the agent to hold monitoring information associated with a web service. One can create instruments to track performance criteria, such as the number of requests per hour, or track business-related information, such as the number of purchase orders that contain a certain item.

An instrument value is updated with an update instrument action. For example, if a web service accepts purchase orders using an acceptPurchaseOrder operation, one might create an instrument to record the number of purchase order requests received. An update instrument action is added to the input processing phase of the acceptPurchaseOrder operation in order to increment the instrument value every time a purchase order request is received.

The values of instruments can be tracked as they change over time. The values of instruments can be recorded in a file by using a log action. The real-time value of instruments can be depicted visually using the management console 536. An instrument can be configured to perform a set of actions when its value changes, such as when the instrument surpasses a defined maximum.

In one embodiment, the autonomous agent of the invention provides a set of built-in instruments that record general information about the agent's functionality. There are instruments that record the number of request and response messages received by the agent, and instruments that record the number of messages that are permitted or denied authorization. In one embodiment, the agent automatically updates these instruments. The management console 536 can display the values of these instruments, as discussed below.

Instruments, the current state of the agent, and any messages define the state in which an event is processed. This state information is referred to as the event's context. The agent's actions access the context as a set of XML documents, known as context documents. Each context document stores specific information about the context in which the event occurred.

In one embodiment of the invention, the following context documents exist.

request: holds the original request message.
response: holds the response message to be returned to the requester.
instruments: provides the current values and configurations of each of the agent's instruments.
UserInformation: provides information about the requester's identity and user roles.
operationInformation: holds information about the handling of the current event, such as the time the event was received by the agent, the processing time, and so on.

Context documents can also be defined for intermediate processing. For example, one might use a transform action to generate a new message to be sent to a web service by a subsequent send action. The transform action can save the message document as a context document named messageToSend, and the send action can retrieve the document by the same name. The agent will retain any custom context documents throughout the input, output and fault message processing phases for a particular message sequence.

As previously indicated, the autonomous agent of the invention also supports authorization policy rules. When an agent encounters a check access action during message processing, the agent uses authorization policies to perform the access check. An authorization policy specifies the access control for one or more web service operations. Authorization policies are defined to describe the conditions under which a request should be forwarded to a target web service operation or a response should be returned to the requesting client. An authorization policy indicates a target (web service, operation, and processing phase), and a set of authorization policy rules that describe the conditions that must be met to access that target.

In most cases, authorization to use a web service is based on the identity or role of the requesting user. However, one can also create authorization policies that are dependent on other information, such as the content of the request message, the time of day that the request is received, or other context information. Authorization policies can be stored persistently in a policy store. An agent can manage its own policy store locally, or can access a central policy store controlled by another agent.

Figure 10A:
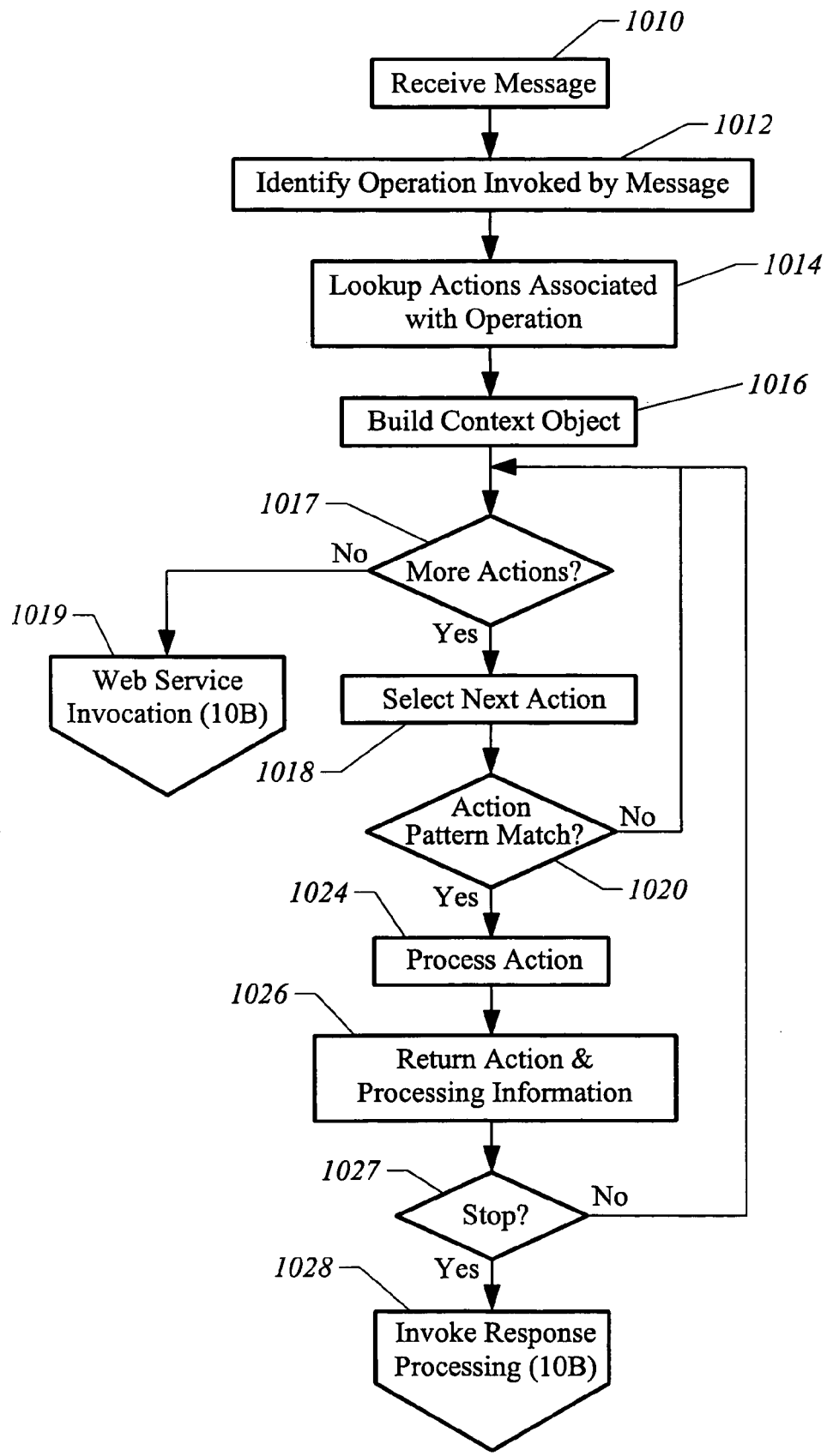
FIGS. 10A-10C illustrate processing steps performed in accordance with an embodiment of the invention.
Figure 10B:
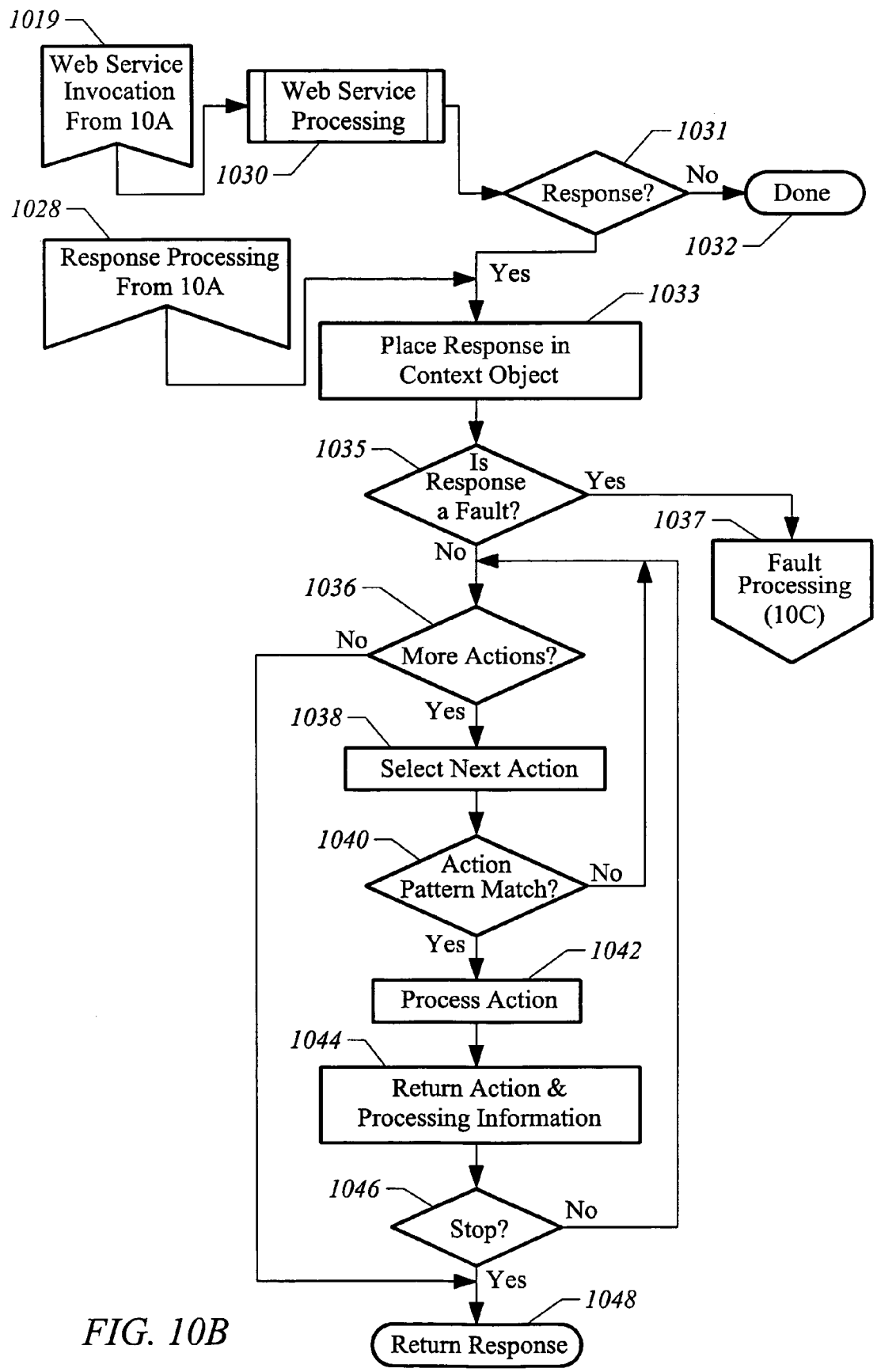
Figure 10C:
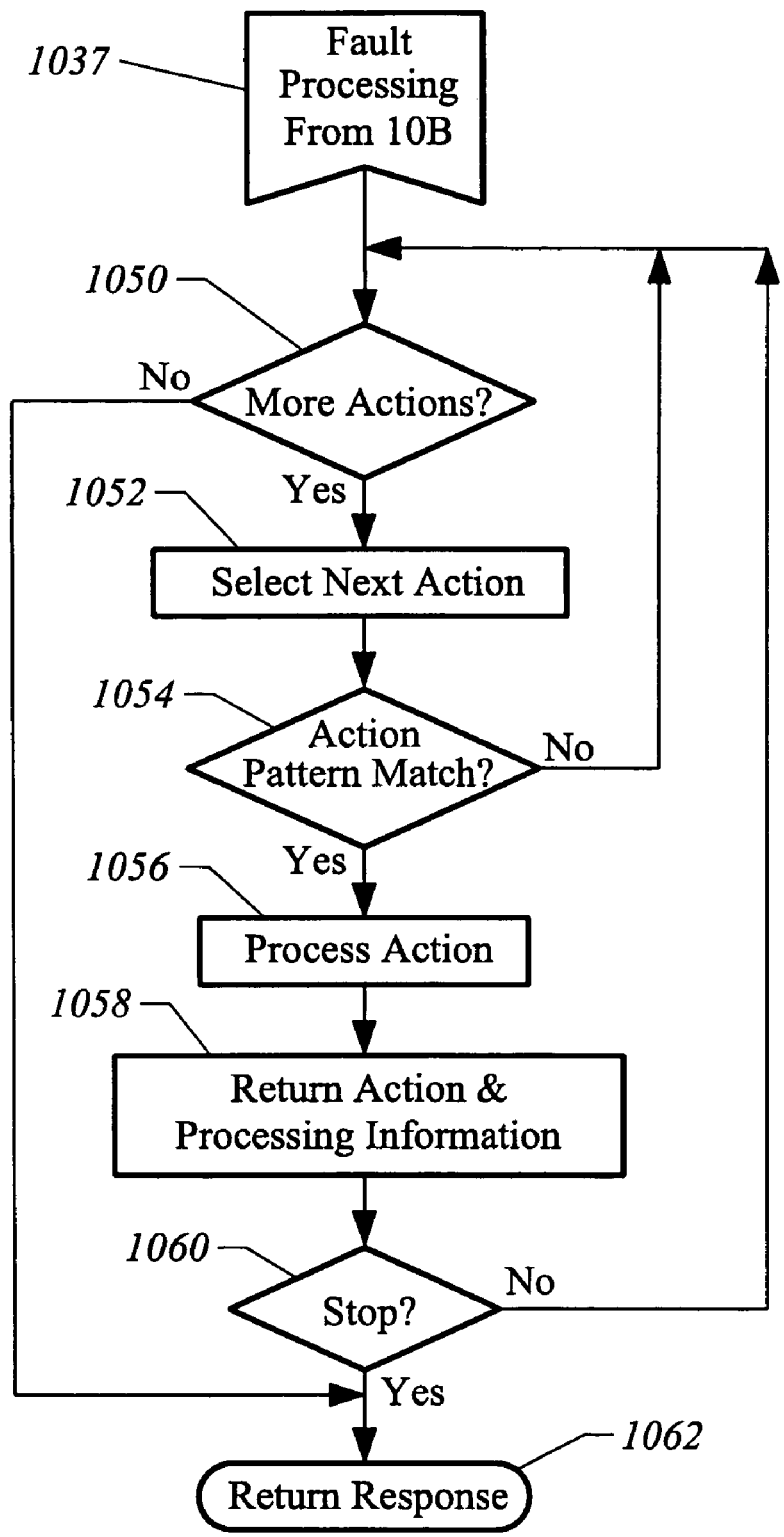

FIGS. 10A-10C provide a more detailed characterization of processing operations performed in accordance with an embodiment of the invention. As indicated by the foregoing discussion, the processing model utilizes the concepts of actions, operations, and context. Actions are the kinds of processing performed in connection with a message. Actions include security checks, logging, and the like. Operations are the WSDL operations associated with the managed web service. The context is a runtime data store that contains useful information for the set of actions.

During the configuration of an agent, the user specifies the set of actions for the agent and the operations to which those actions apply. The set of actions for an operation are ordered in the configuration.

FIG. 10A illustrates that an initial processing operation is to receive a message (block 1010). The operation invoked by the message is then identified (block 1012). Next, the actions associated with the operation are identified (block 1014).

The next processing operation of FIG. 10A is to build a context object (block 1016). The context object is unique for the message invocation. Its lifetime is the same as the operation's lifetime. This means that both the request and the response processing of the operation share the same context object. Because of this, the context is referred to as an operation instance context.

In one embodiment of the invention, the context object contains data in the form of a set of XML documents. Some of these documents are unique to this context while others are shared between this context object and other context objects currently active in this instance. The context data includes things like: the message being processed; information about the message, such as the operation name, the time it arrived, the user invoking the operation; and the current set of instruments within the agent.

The data in the context can be read and updated by the actions. Updates can include adding a new document, removing a document or modifying a document. Note that since the message is one of the documents in the context, an action can read and change the message.

Once the messaging system creates the context, it begins stepping through the list of actions in order. If there is another action (block 1017—"Yes"), then the next action is selected (block 1018). If there are no more actions, the web service is invoked (block 1019). If the next action pattern does not match the context (block 1020—"No"), then processing returns to block 1017. If the action's pattern matches the context, then the messaging system notifies the action and waits for the action to process (block 1024). The input action is returned along with a processing instruction (block 1026). If the processing instruction does not equal "stop", then processing returns to block 1017 (block 1027—"No"). If the action returns a value that says to stop processing (block 1027—"Yes"), then the messaging system response processing is invoked (block 1028).

Observe that the processing of FIG. 10A is performed by the agent of the invention. The web service processing at block 1030 of FIG. 10B is performed by a standard web service. As shown in FIG. 101B, the web service processing is invoked from block 1019 of FIG. 10A.

If a response from the web service is not required (block 1031—"No"), then processing is completed (block 1032). If a response is generated by the web service (block 1031—"Yes"), then the messaging system places the response into a response document within the context (block 1033). If the operation is one-way, the action may, but need not, put a response into the context. Such a response for a one-way operation is useful for faults that actions generate since placing the fault into the context allows processing of the fault during response processing. This can be useful for logging faults.

If the response is a fault (block 1035—"Yes"), then the fault processing of FIG. 10C is invoked (block 1037). If the response is not a fault (block 1035—"No"), then response processing proceeds in a manner similar to request processing. The main difference is that response processing uses the same context as the request processing instead of creating a new context. When response processing is initiated, the agent changes the operation name to match the response. The agent then finds the action list for the name and begins the action processing. Thus, output phase processing operations 1036-1046 correspond to previously described input phase processing operations 1017-1027. The final processing operation of FIG. 10B is to return the responses to the client (block 1048).

Fault processing is illustrated in FIG. 10C. Fault processing is performed in the same manner as response processing. Fault processing is invoked when the system detects a fault indication in the response message, as shown with block 1037 of FIGS. 10B and 10C. Processing blocks 1050-1062 of FIG. 10C correspond to previously described processing operations 1017-1027 of FIG. 10A.

As indicated, the agents of the invention may be invoked by using a management console 536. The management console provides tools to connect to one or more agents so that one can configure the agents, monitor their activities, and define authorization policies. In one embodiment, the management console 536 includes an environment monitor 537, an agent configuration editor 538, and an authorization policy editor 539. In one embodiment of the invention, these tools 537, 538, and 539 act as clients to the agent. The agent is implemented as a web service that provides management operations for its clients. The clients connect to the agent through the use of the agent's management WSDL file, which lists the operations and SOAP messages necessary for monitoring and configuring the agent. Note that the agent's management WSDL file is distinct from the WSDL file that the agent provides to the web service clients.

Figure 11:
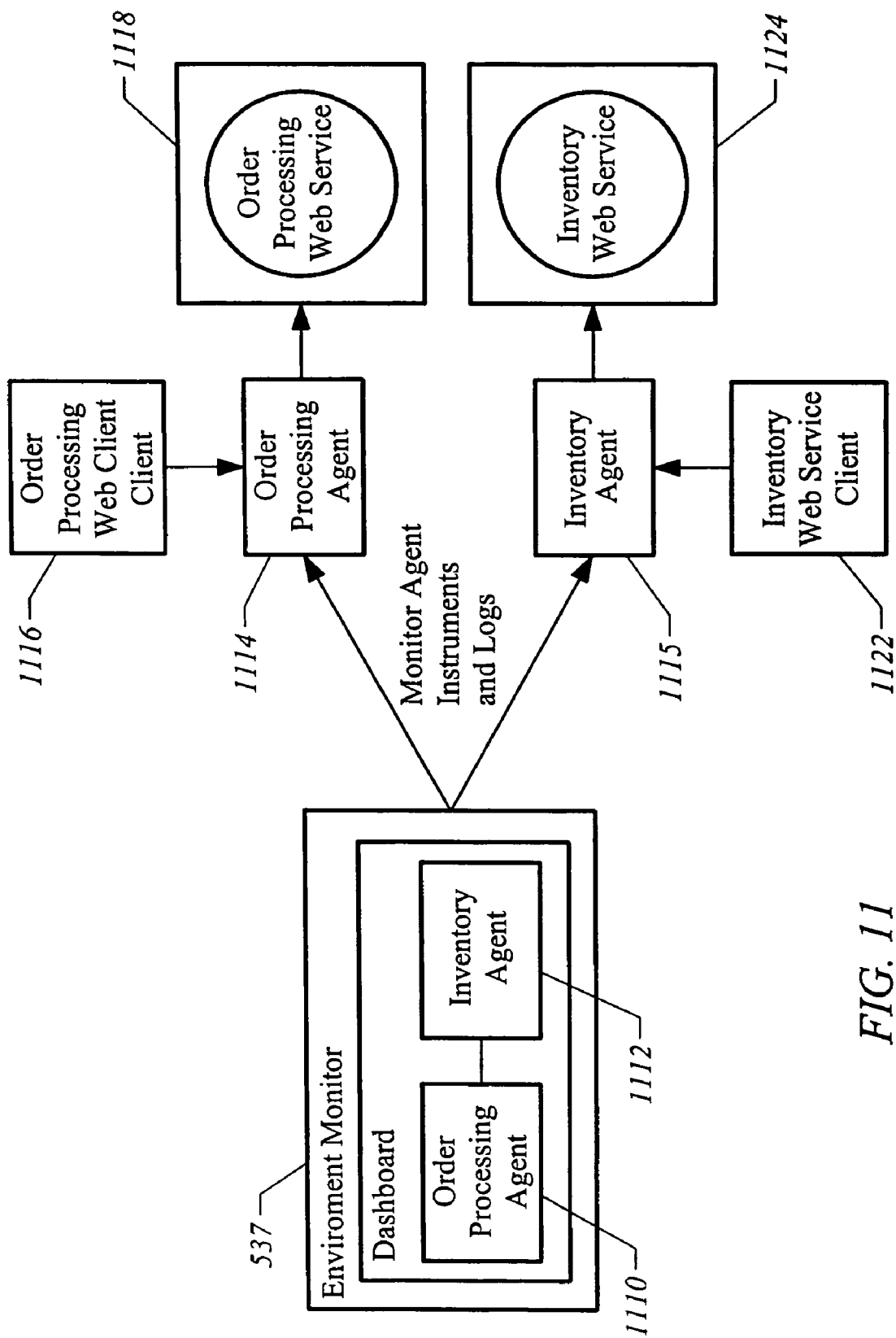
FIG. 11 illustrates the operation of an environment monitor implemented in accordance with an embodiment of the invention.

FIG. 11 illustrates an environment monitor 537. The environment monitor 537 provides a dashboard representation of an order processing agent 1110 and an inventory agent 1112. The order processing dashboard representation 1110 corresponds to an actual order processing agent 1114 configured in accordance with an embodiment of the invention. The order processing agent 1114 interacts with an order processing web service client 1116 and an order processing web service 1118 in a manner consistent with previous discussions. Similarly, the inventory agent 1112 interacts with the inventory agent 1115, the inventory web service client 1122 and the inventory web service 1124 in a manner consistent with previous discussions.

The environment monitor 537 provides separate visual representations of a business process. This separate visual representation can be used to depict the state of agents, and, by extension, the state of the web services that those agents manage. Any agent may be included in any number of environments. The inclusion of an agent in an environment has no direct impact on any of the web services that it manages.

The environment monitor 537 is configured to allow the creation of separate visual representations of a business process for a system manager and a business analyst. Instrument panels may be supplied to show the values of agent instruments. Bar charts and strip charts may be used to track the values of instruments over time.

The environment monitor 537 allows one to monitor a distributed web service application and depict its operation in the visual dashboard. When the environment monitor is used in the editing mode, one can connect to any number of active agents and construct a visual depiction of the system. The environment monitor supports the configuration of freeform diagrams to depict a web service system in the manner that makes the most sense for an organization. The diagrams can include symbols, text values, strip charts, and bar values that are bound to instruments in the connected agents.

In one embodiment, the environment monitor is configured to operate in an online active monitoring mode. When online, the environment monitor communicates with the running agents. The environment monitor can also be placed in monitoring mode while the graphical view is under development, so one can see how the diagram will work at runtime. After development of the diagram, one may choose to put the dashboard in a read-only state, and use it exclusively for monitoring the running web service application.

Figure 12:
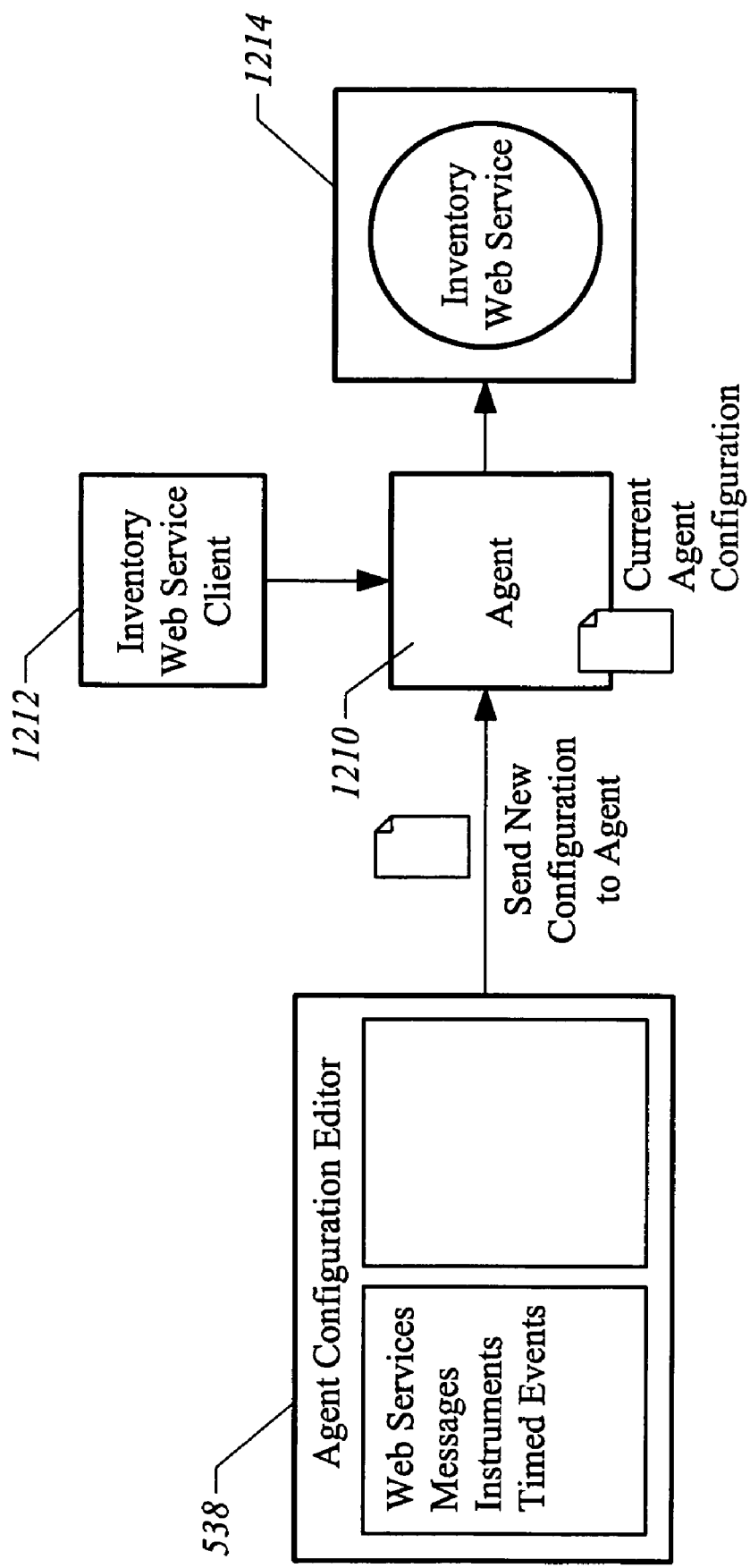
FIG. 12 illustrates the operation of an agent configuration editor implemented in accordance with an alternate embodiment of the invention.

FIG. 12 illustrates the operation of an agent configuration editor 538 configured in accordance with an embodiment of the invention. The agent configuration editor 538 is used to specify the web services the agent will manage, the instruments the agent will record, the timers that the agent will set, and the actions the agent will perform. For example, the agent configuration editor 538 may supply an action list to a user, allowing the user to form different functional modules that are subsequently executed by the agent.

As shown in FIG. 12, the configuration information is sent from the agent configuration editor 538 to the agent 1210, where it is stored. The agent 1210 interfaces with a web service 1214 in accordance with the specified configuration.

The agent configuration editor 538 operates as a client to the agent 1210. When the agent configuration editor 538 connects to the agent 1210, it retrieves the agent's current configuration. As indicated, an edited configuration is submitted to the agent for implementation.

Figure 13:
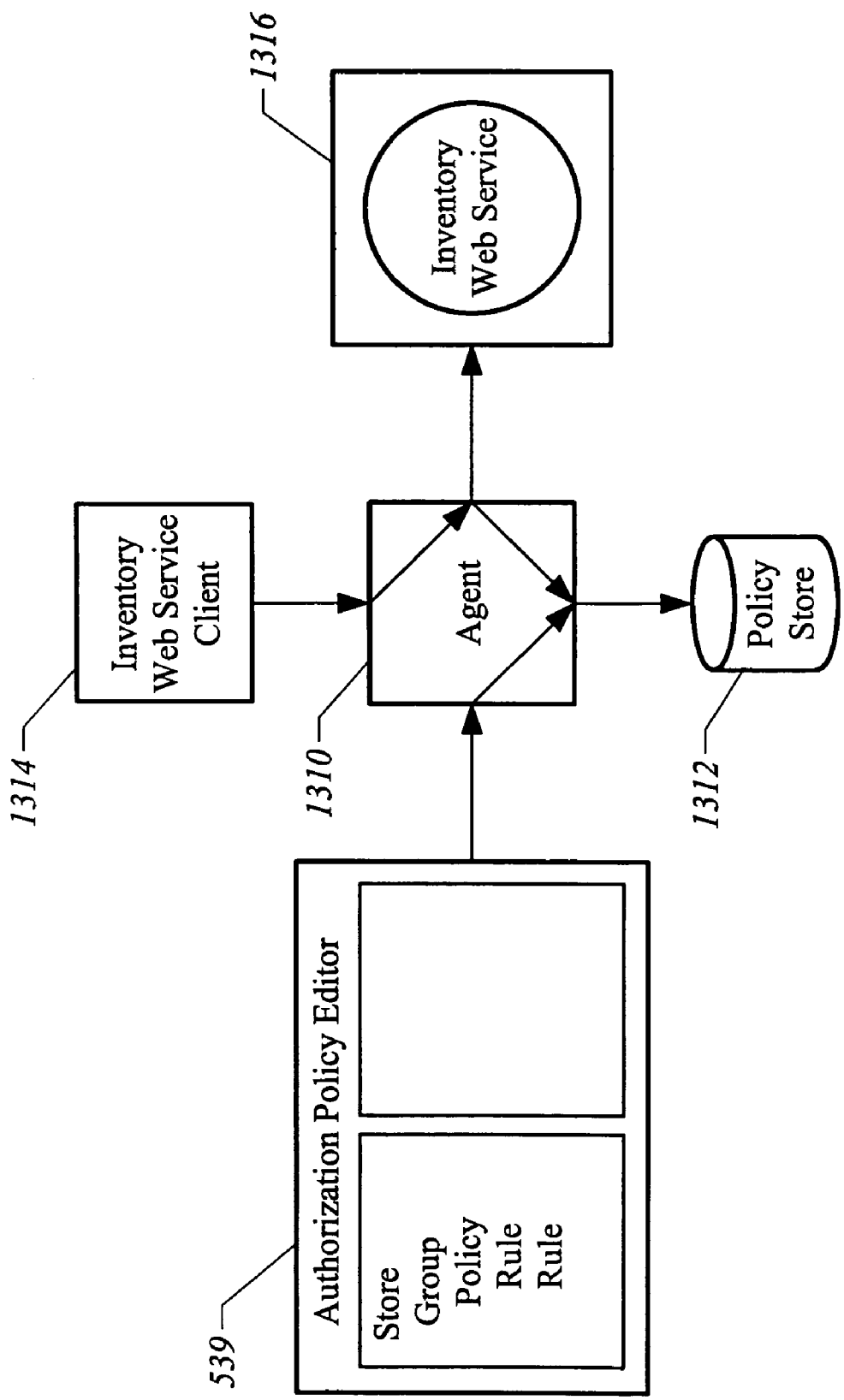
FIG. 13 illustrates the operation of an authorization policy editor implemented in accordance with an embodiment of the invention.

FIG. 13 illustrates the operation of an authorization policy editor 539 configured in accordance with an embodiment of the invention. The authorization policy editor 539 is used to specify authorization policy rules, which are submitted to an agent 1310. The agent 1310 stores the policy rules in a policy store 1312. When a client 1314 sends a request message to an agent configured for authorization (through the use of a checkAccess action), the agent evaluates the request against the appropriate authorization policies for the requested web service operation. If authorization is granted, access to the web service 1316 is provided. Otherwise, access to the web service 1316 is blocked at the agent 1310.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer readable storage media storing instructions executable by a computer to provide a web service, comprising:
   an autonomous software agent for interacting with the web service without altering the underlying code associated with the web service and configured to:
   receive a request directed to the web service;
   identify a web service input operation associated with said request, said web service input operation including a call to a procedure supported by said web service;

associate said web service input operation with a set of input actions, wherein said set of input actions includes at least one action that performs a processing operation based upon content processing and context processing of an original operation specified within said request so as to extend the functionality of said procedure supported by said web service, wherein said content processing includes an analysis of content within the request to determine if the request satisfies a condition and said context processing includes tracking a value for a time period to determine if the value exceeds a threshold; and execute said input actions prior to directing said request to said web service.

2. The computer readable media of claim 1 wherein said autonomous software agent is further configured to:

receive a response from said web service;

identify a web service output operation associated with said response;

associate said web service output operation with a set of output actions; and execute said output actions prior to directing said response to a client.

3. The computer readable media of claim 1 wherein said autonomous software agent is further configured to:

receive a fault response from said web service;

associate said fault response with a set of fault actions; and execute said fault actions.

4. The computer readable media of claim 1 further comprising a management console to facilitate the formation of said autonomous software agent.

5. The computer readable media of claim 4 wherein said management console includes an agent configuration editor to form a configuration module for submission to said autonomous software agent.

6. The computer readable media of claim 4 wherein said management console includes an environment monitor to facilitate the supervision of operating parameters associated with said autonomous software agent.

7. The computer readable media of claim 4 wherein said management console includes an authorization policy editor to form a web service access policy executed by said autonomous software agent.

8. The computer readable media of claim 1 wherein said autonomous software agent includes a module layer, a core layer, and a platform layer.

9. The computer readable media of claim 1 further comprising an action list specifying a set of selectable actions to perform in connection with a web service operation.

10. The computer readable media of claim 1 wherein said autonomous software agent provides a context object for use by sets of actions.

11. The computer readable media of claim 1 wherein said autonomous software agent provides a context object, to characterize the state of said autonomous software agent.

* * * * *